Jan. 25, 1966 E. W. WILKINS 3,230,869
RAISING AND CLAMPING MEANS FOR SLIDING BOLSTERS
Filed June 5, 1963 7 Sheets-Sheet 3

INVENTOR.
EDWARD W. WILKINS
BY

ATTYS.

Jan. 25, 1966  E. W. WILKINS  3,230,869
RAISING AND CLAMPING MEANS FOR SLIDING BOLSTERS
Filed June 5, 1963  7 Sheets-Sheet 5

INVENTOR.
EDWARD W. WILKINS
BY
ATTYS.

United States Patent Office 3,230,869
Patented Jan. 25, 1966

3,230,869
RAISING AND CLAMPING MEANS FOR SLIDING BOLSTERS
Edward W. Wilkins, Albrighton, near Wolverhampton, England, assignor to Wilkins & Mitchell Limited, Darlaston, England
Filed June 5, 1963, Ser. No. 285,640
Claims priority, application Australia, June 19, 1962, 19,075/62; July 25, 1962, 20,387/62
13 Claims. (Cl. 100—214)

This invention relates to improvements in moving bolster presses of the type wherein a die-set is mounted on a moving bolster outside of a press and is run into the press on the bolster which is movable into the press on tracks.

It has previously been thought necessary to move a bolster into a press and then lower it on to a bed before using the dies. This arrangement, however, is generally unsatisfactory because of the complexity of the mechanism used, and the mian object of this invention is to provide improvements wherein the bolster need not necesarily be lowered when positioned in a press.

A further problem which is encountered with the previously proposed arrangements has been the tendency for misalignment and damage to mating surfaces due to dirt, swarthe and other undesirable material, settling on the bolster supporting surface before a bolster is positioned thereon. A further object of this invention is to provide means whereby the tendency for dirt to cause misalignment between mating surfaces is reduced.

In its simplest form, a moving bolster press according to this invention includes a bed, tracks extending from one side of the bed over the bed, a moving bolster, transverse shafts on the moving bolster, wheels on the transverse shafts engaging the tracks, wedge members movable between the bed and the bolster when the bolster is disposed above the bed, hydraulic cylinders linked to the wedges and operable to move them in the direction of slope of their wedge surfaces, and complementary wedge engaging surfaces on both the bed and the bolster, whereby the wedges are operable either to lift the bolster from the bed or lower it thereto under control of the hydraulic cylinders.

Figure 1:
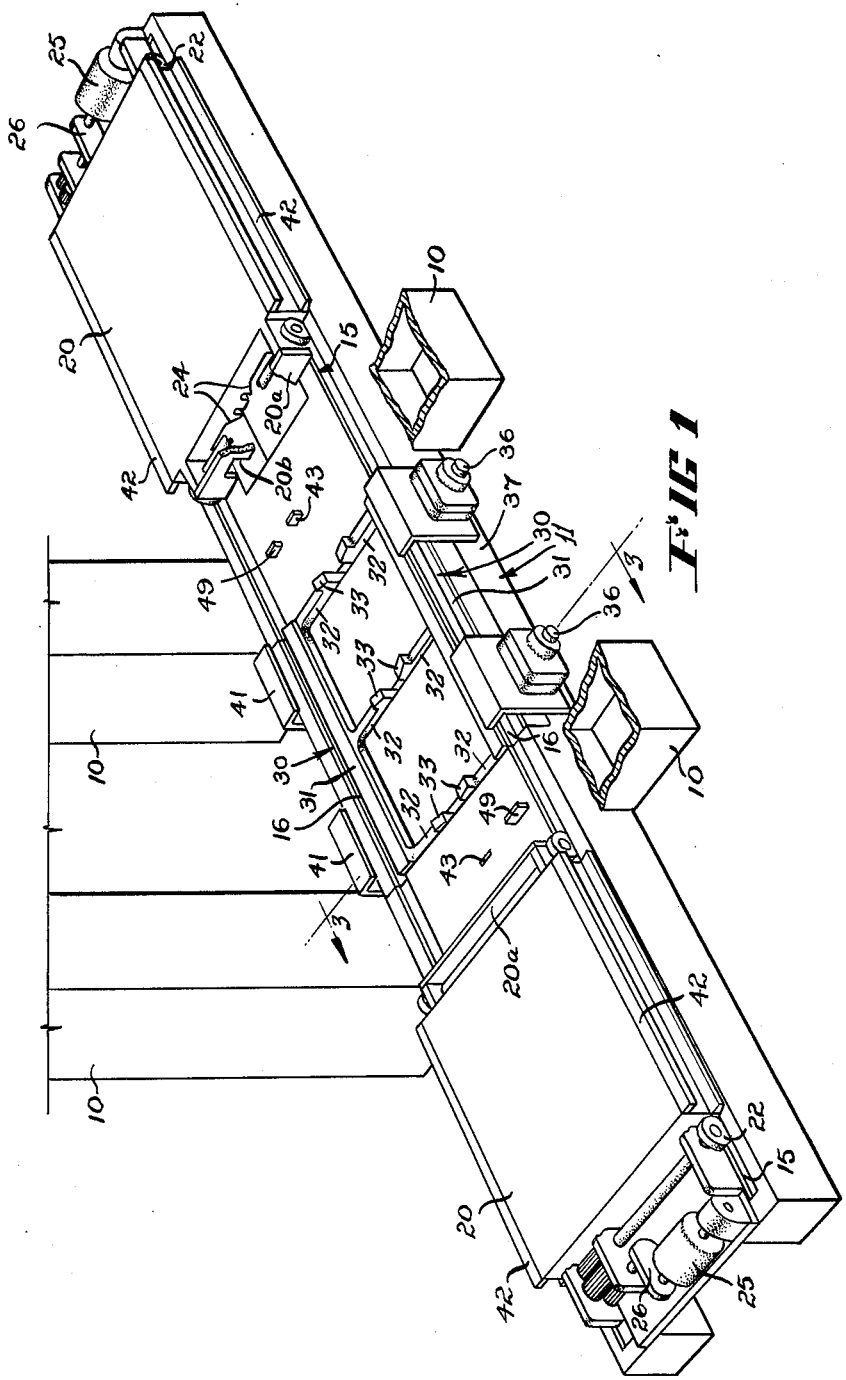
Figure 2:
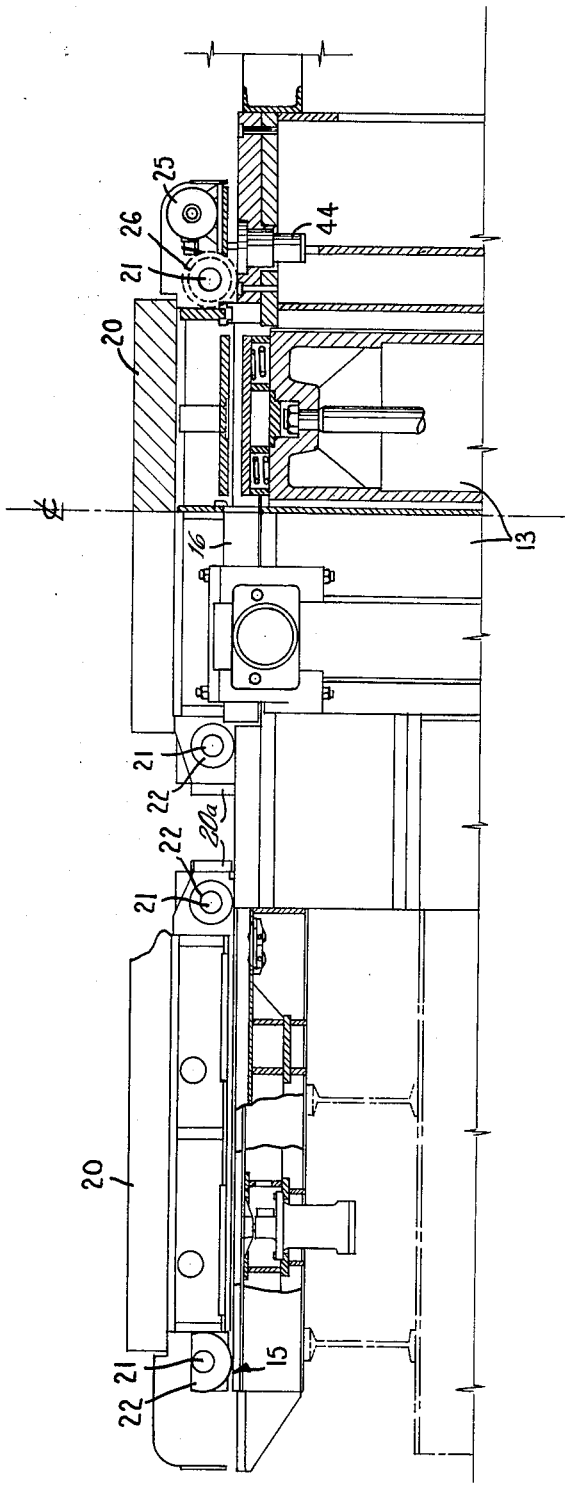
Figure 3:
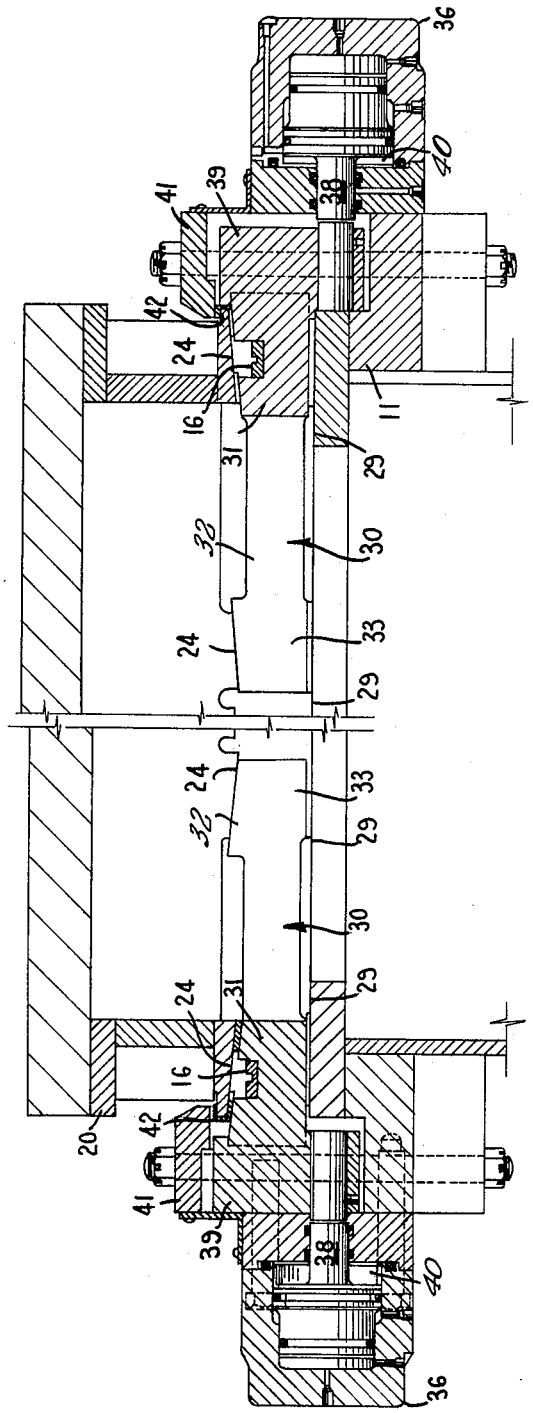
Figure 4:
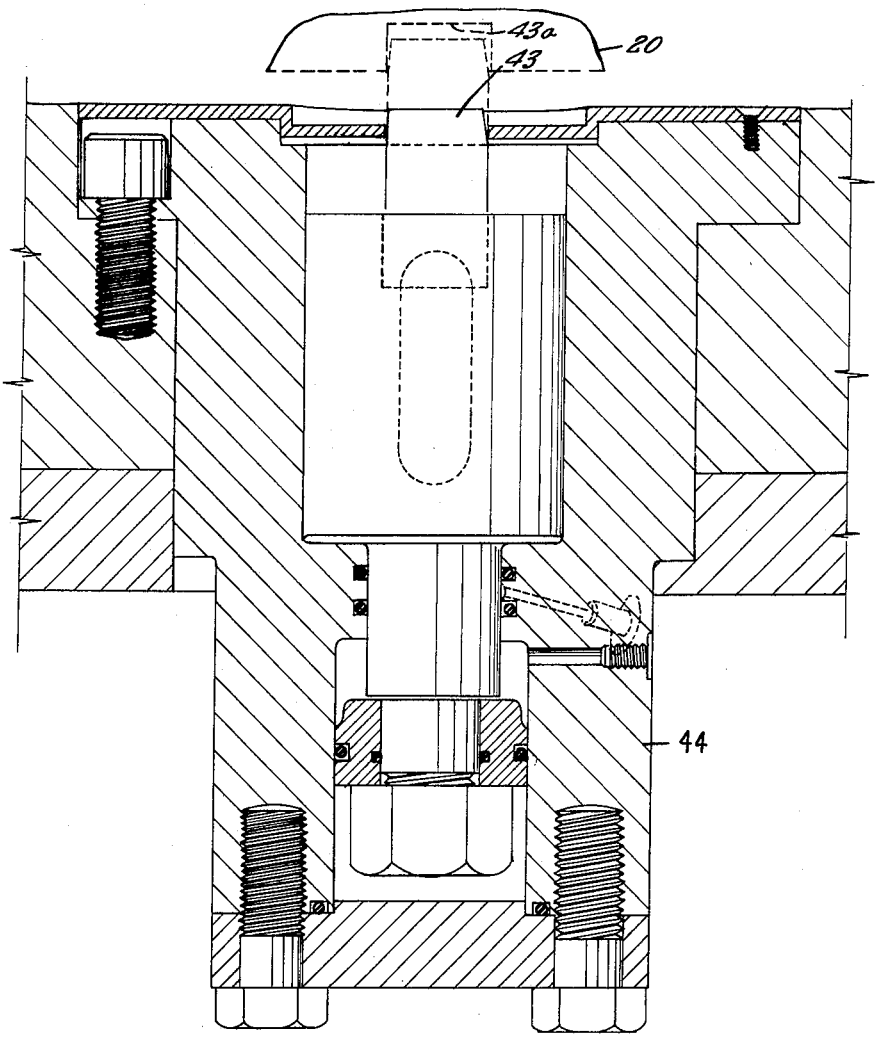
Figure 5:
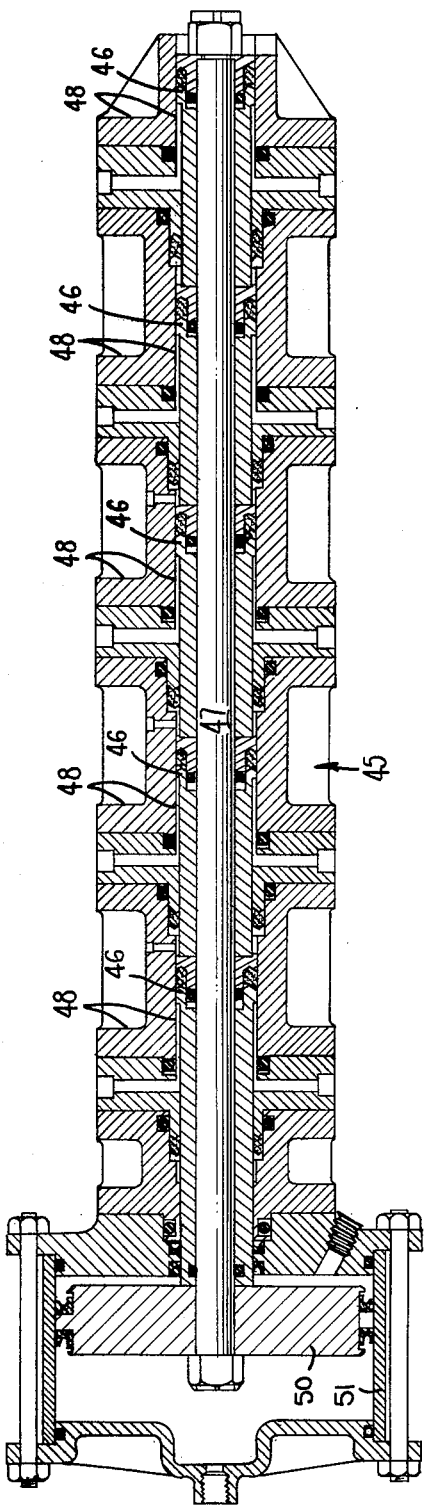
Figure 6:
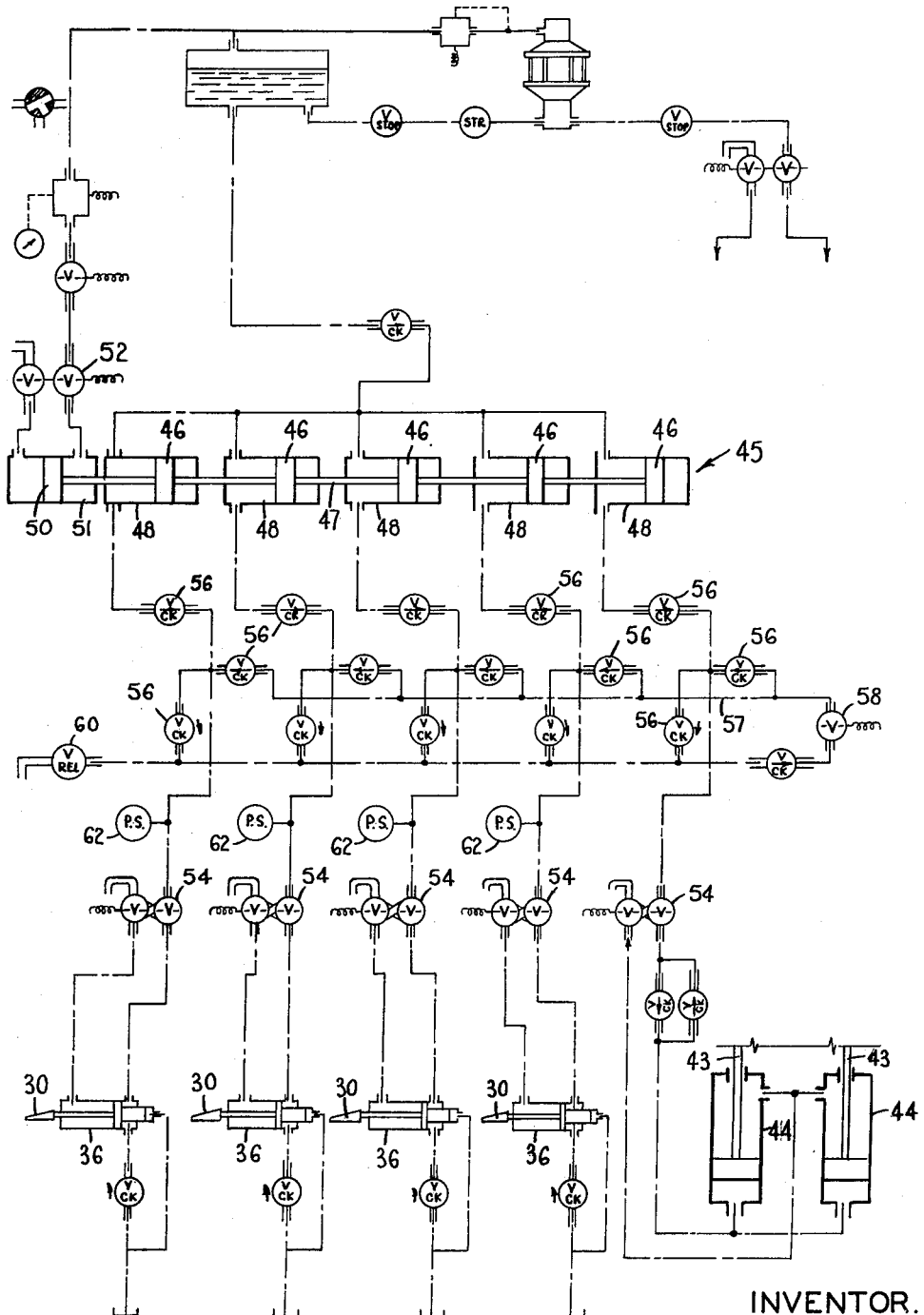
Figure 7:
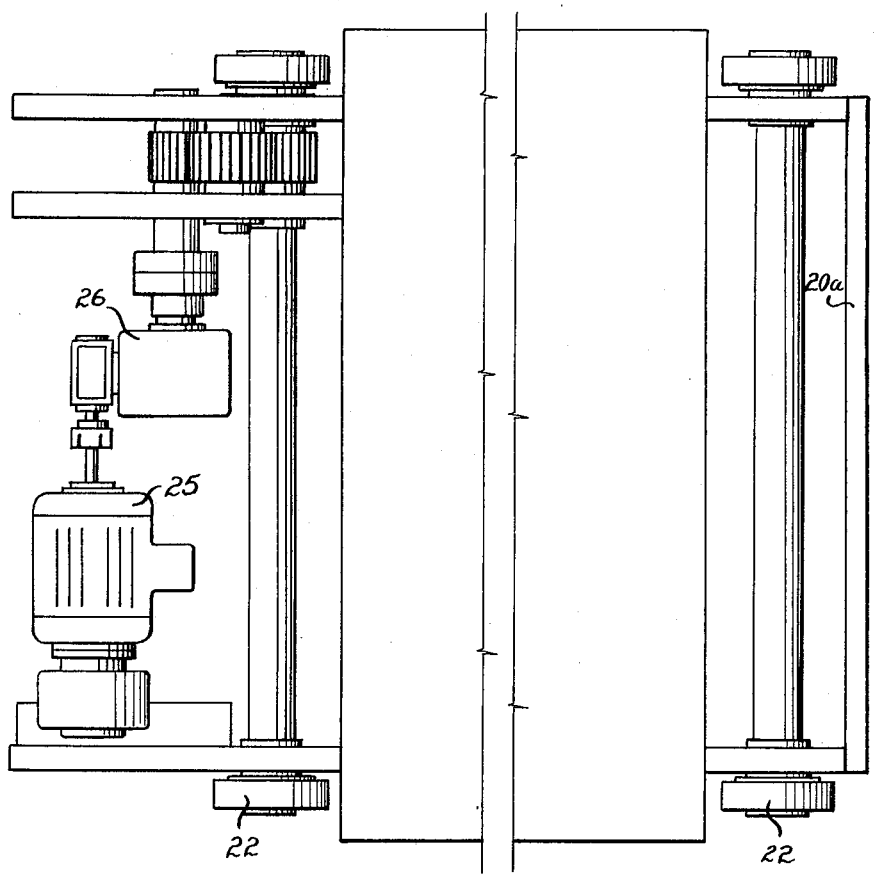

An embodiment of the invention is described hereunder in some detail with reference to and is illustrated in the accompanying drawings, in which:

FIG. 1 is a fragmentary perspective view of a bed of a press showing the tracks and moving bolsters, FIG. 2 is a partly sectioned fragmentary longitudinal view of the bed, tracks and bolsters, FIG. 3 is a section taken on plane 3—3 of FIG. 1, but showing a bolster in position over the center portion of the bed, FIG. 4 is a section through a key cylinder showing the mode of operation of the key, FIG. 5 is a section through the hydraulic pump used to move the wedges into and out of engagement with a bolster, FIG. 6 shows in diagrammatic form the hydraulic circuit, and FIG. 7 shows in plan a view of the moving bolster, drawn to an enlarged scale to illustrate the driving mechanism therefor.

According to this embodiment a press has four posts 10 which slidably support the moving head (not shown), and a bed 11. The bed 11 is fitted with air cushions 13 in accordance with standard press practice, and bed 11 has extending from each of two opposite side faces a pair of tracks 15. These tracks are made continuous through the press, by being aligned with tracks 16 on wedge members, as hereinafter described, which tracks 16 have center portions. The apparatus includes a pair of bolsters 20, each of which has transverse shafts 21 on which are disposed wheels 22, the wheels 22 engaging the outer tracks 15, and then the track 16 aligned therewith as a bolster moves from an outer position inwardly over the bed 11. Each bolster 20 is formed with eight wedge engaging surfaces 24, four on each end thereof, the surfaces on each end being arranged symmetrically two on each side of the longitudinal centre line of each bolster. Each bolster is motor driven by an electric motor 25 which drives the outer wheels 22 through a gearbox 26 (see FIG. 7). The bed 11 also has wedge engaging surfaces 29 which are disposed in a horizontal plane.

A pair of wedge members 30, that position the tracks 16, are arranged longitudinally one along each side of the bed 11. Each wedge member 30 is somewhat in the shape of an E, and has a single longitudinal wedge portion 31 which itself has three inwardly disposed legs 32, each leg 32 terminating at its inner end in an inner wedge portion 33. The longitudinal wedge portion 31 of each wedge member 30 contains the track 16 which forms part of the track 15 when the wedges are in their "out" position. This is illustrated in cross-section in FIG. 3. The longitudinal distance between the wheels 22 of each bolster 20 exceeds the length of the track 16 (and the wedge members 30) so that the bolster 20 bridges the wedge members 30 when they are moved inwardly or outwardly.

The wedge members 30 are under the control of hydraulic wedge cylinders 36 which are mounted on the outer side faces 37 of the bed 11, and the piston rods 38 of each are directly secured to blocks 39 on the side faces of the longitudinal wedge portions 31 of the wedge members 30. There are four of these hydraulic wedge cylinders 36, two on each side. Each wedge cylinder 36 has a cushion portion 40 which is associated with a check valve and a flow restrictor valve (not shown).

When the piston rods 38 are moved inwardly towards the centre of the press, they force the wedge members 30 inwardly so that the wedge supporting faces 24 on a bolster 20 are slidably engaged to urge the bolster upwardly, and the upward movement is limited by an overhang stop 41 on the bed 11 which engages a shelf 42 on the bolster 20 (see FIG. 3). FIG. 3 illustrates this action by showing the left-hand portion with the wedge members 30 drawn outwardly from the centre line of the press and the right-hand portion with the wedge members 30 in towards the centre line of the press so as to lift the bolster 20. The vertical faces of the shelves 42 function as transverse stops thereby locating the bolster in its transverse position.

It is of course necessary that the bolsters 20 should be exactly positioned in their longitudinal travel along the tracks when the press is to be used, and this is achieved by having a pair of keys 43 which are driven upwardly by hydraulic pressure in the key cylinders 44 (see FIG. 4). These keys enter complementary openings 43a in the underfaces of the bolsters 20 so as to prevent any longitudinal movement.

It is clearly desirable that the wedges should move in and out in unison, and so as to achieve this, this invention includes a pump 45 wherein a number of pistons 46 are secured on a single piston rod 47, each piston 46 co-operating with a pumping cylinder 48, and the cylinders 48 being arranged in tandem. The keys 43 are however not driven in until the bolster has been roughly positioned against a fixed mechanical stop 49 in the bed. Each inner end plate 20a of the bolsters contains a notch 20b to allow the end plate to pass the stop 49 which is effective to limit movement of the other bolster, the stops 49 being out of alignment in a longitudinal direction. The piston rod 47 in this embodiment is reciprocated by means of a pneumatic piston 50 on one end which engages the walls of an air cylinder 51, the air cylinder 51 being controlled by the solenoid air valve 52 (see FIG. 6). The hydraulic pump cylinders 48 and pistons 46 are all of identical size, and the cylinders 36 which drive the wedges in are also of identical size, while the two key cylinders 44 which drive the keys 43 in are similarly of identical size, although of different size from the cylinders 36 which drive the wedges in. The oil delivered at pressure from the pumping cylinders 48 to the wedge cylinders 36 and to the key cylinders 44 passes through solenoid oil valves 54, one solenoid valve 54 for each of the wedge cylinders and one for the key cylinders which are connected in parallel with each other. In addition to the solenoid valves 54, each pump unit is associated with three check valves 56, one of which allows free flow of oil from the pump unit to the solenoid valve, and also to the other two check valves, a second of the check valves being connected to a common line 57 which both allows limited compensation for varying outputs of the pumps in the case of leakage or the like, and also provides an oil supply point for an interconnecting solenoid valve 58, while the third check valve associated with each pump unit is connected to the other side of the interconnecting solenoid valve 58, so that when the interconnecting solenoid valve 58 is energized oil from the common line 57 can pass through the check valves 56 of the pump units, and operate the key cylinders 44, and when the key cylinders 44 are "home," the solenoid valve 58 then closes, the oil then operates the wedge cylinders. The common line also contains a relief valve 60. FIG. 6 also shows the other valves which are required for completion of the circuit in a practical installation.

The operating sequence is briefly as follows:

First considering the system at rest with the keys and wedges in, all solenoids are de-energized and the pump cylinders and key cylinders are linked to the common line which is maintained by the pump at up to 2,000 p.s.i. Pressure switches 62 on each of the lines leading to the wedge cylinders are closed but have no further effect upon the system.

When the control switch is moved to the "out" position, this stops the pump and energizes all solenoids 54. Each solenoid valve 54 in the hydraulic lines to the wedges and keys is associated with sensing switches (not shown), and when all sensing switches indicate that all solenoids valves have "changed over," the pump starts and the keys and wedges move out. The displacement from each of the wedge cylinders is identical, and the displacement from the two key cylinders in parallel equal the displacement from any one of the wedge cylinders, so that the wedges and keys move out at a common speed. If any pressure switch operates before all wedges are within the last one-sixteenth of an inch of the stroke, that is, before limit switches are operated by the wedges, the pump will be stopped and a warning signal given.

When all the wedges are within the last one-sixteenth of an inch of travel, and any one of the pressure switches 62 operates, the interconnecting solenoid valve 58 is de-energized so that all lines are connected to the common line 57 and the wedges and keys move out at common pressure and are positively held out against their stops. Sensing switches indicate that the keys are down and the wedges are out, and the bolster may then be moved along its supporting rails.

If the selector switch is moved to "in" position, the solenoid valve controlling the keys is de-energized and the keys move in. When the keys are fully in limit switches (not shown) are depressed and this stops the pump and de-energizes the solenoid valves 54 leading to the wedge cylinders and at the same time energizes the solenoid valve 58 connecting the wedge cylinders to the common line. When the sensing switches on the solenoid valves indicate that all the solenoid valves are in their correct positions, the pump re-starts and the wedges move in. If any of the pressure switches operates before all the wedges are within the last one-sixteenth of an inch of stroke, the pump stops and a warning signal is given. When all the wedges are within the last one-sixteenth of an inch of travel, the limit switches are operated, the interconnecting solenoid valve is de-energized, whereby all the lines are joined to the common pressure and the wedges and keys are positively driven home. The sensing switches then indicate that all wedges and keys are fully in, and that the bolster is in place, whereupon the press may be operated provided all other conditions are satisfied.

It will, of course, be seen that the electrical interlock circuit must be arranged that the bolster may only be moved with the keys down and the wedges out. The circuit is also arranged so that it is impossible to move the keys and wedges unless the bolster is correctly positioned either fully in or fully out, this, of course being by switch means. During any part of the "out cycle" it is possible to reverse to "in" and the system operates from this position as it normally would, and vice versa.

It will, of course, be seen that the above embodiment can be widely varied. For example, reciprocation of the pump cylinders may be by motor driven means, or alternatively a hydraulic pump may be used to reciprocate the pistons in the cylinders. Alternatively, the pistons may be arranged in parallel instead of in tandem and may be each independently driven, but each has sufficient capacity that it will be certain to provide ample quantity of oil for moving the wedge cylinders in or out.

What I claim is:

1. A moving bolster press comprising:
   a bed,
   wedge engaging surfaces on the bed,
   tracks extending from one side of the bed outwardly away from the bed,
   further tracks extending away from the opposite side of said bed from, and in alignment with, the first said tracks,
   a moving bolster,
   wedge engaging surfaces on the bolster disposed immediately above corresponding wedge engaging surfaces on the bed when the bolster is in its operative position,
   transverse shafts on said moving bolster,
   wheels on said transverse shafts engaging said tracks,
   wedge members each having a pair of vertically spaced wedge surfaces movable between the wedge engaging surfaces of said bed and said bolster when said bolster is disposed above said bed in its operative position, said wedge members having a released position,
   further tracks on said wedge members and aligned with said tracks extending away from the sides of the bed when said wedge members are released,
   wedge cylinders linked to said wedge members and operable to move said wedge members in the direction of slope of their said wedge surfaces, and
   said wedge engaging surfaces on said bed and bolster being complementary to said wedge surfaces of said wedge members whereby said wedge members are operable either to lift the bolster from the bed or lower it thereto under control of said wedge cylinders.

2. A moving bolster press according to claim 1 further comprising:
   a second similar bolster similarly movable along said tracks and similarly engageable by said wedge members.

3. A moving bolster press according to claim 1 further comprising:
   stops on said bed engageable by said bolster when positioned in its operative position within said press.

4. A moving bolster press according to claim 1 further comprising:

a longitudinal wedge portion on each said wedge member, a plurality of legs on each said wedge member integral with and disposed inwardly of said longitudinal wedge portion, and a wedge portion having on the inner end of each inwardly disposed leg and having said wedge surfaces thereon.

5. A moving bolster press according to claim 1 further comprising:

an overhung step on said bed, and a shelf on said bolster disposed above said bed, and engageable against said step when said bolster is disposed above said bed and is lifted by said wedge member.

6. A moving bolster press according to claim 1 further comprising:

vertically disposed key cylinders in the bed, and vertically movable keys operatively connected to the key cylinders engageable in said bolster when positioned in its operative position within said press.

7. A moving bolster press according to claim 1 comprising:

a second similar bolster similarly movable along said tracks and similarly engageable by said wedge members, an overhung step on each side of said bed, a shelf on each side of each of said bolster disposed beneath said overhung step when said bolster is disposed above said bed, and engageable against said step when said bolster is lifted by said wedge member.

8. A moving bolster press according to claim 1 comprising:

a second similar bolster similarly movable along said tracks and similarly engageable by said wedge members, an overhung step on each side of said bed, a shelf on each side of each said bolster disposed beneath said overhung step when said bolster is disposed above said bed, and engageable against said step when said bolster is lifted by said wedge members, key cylinders mounted vertically in the bed, a piston rod extending outwardly from each key cylinder, and a vertically movable locating key on each said piston rod engageable in a said bolster when positioned in its operative position within said press.

9. A moving bolster press according to claim 1 comprising:

a second similar bolster similarly movable along said tracks and similarly engageable by said wedge members, an overhung step on each side of said bed, a shelf on each side of each said bolster disposed beneath said overhung step when said bolster is disposed above said bed, and engageable against said step when said bolster is lifted by said wedge members, stops on said bed engageable by each of said bolsters when positioned in respective operative position within said press.

10. A moving bolster press according to claim 1 further comprising:

a multi-cylinder reciprocable hydraulic piston pump, and a separate hydraulic line from each cylinder of said piston pump to a corresponding said wedge cylinder.

11. A moving bolster press according to claim 1 further comprising:

a multi-cylinder reciprocable hydraulic piston pump, means interconnecting the piston pump pistons for equal displacement thereof upon pump operation, a separate hydraulic line from each cylinder of said piston pump to a corresponding said wedge cylinder, and a two-way valve in each said hydraulic line.

12. A moving bolster press according to claim 1 further comprising:

at least one location key cylinder on said bed, a locating key on said key cylinder, a multi-cylinder reciprocable hydraulic piston pump, a separate hydraulic line from each cylinder of said piston pump to corresponding wedge cylinder, a series of check valves each between a said hydraulic line and a common hydraulic line, and an interconnecting valve between said common hydraulic line and a line leading to said key cylinder.

13. A moving bolster press according to claim 1 comprising:

a second similar bolster similarly movable along said tracks and similarly engageable by said wedge members, an overhung step on each side of said bed, a shelf on each side of each said bolster disposed beneath said overhung step when said bolster is disposed above said bed, and and engageable against said step when said bolster is lifted by said wedge members, a pair of hydraulic key cylinders on the bed disposed beyond the ends of said wedge members, a piston rod extending outwardly from each said key cylinder, a locating key on each said piston rod, a multi-cylinder reciprocable hydraulic piston pump, and a separate hydraulic line from each cylinder of said piston pump to a corresponding said wedge cylinder, and to said pair of hydraulic key cylinders.

References Cited by the Examiner

UNITED STATES PATENTS 2,940,384 6/1960 Munschauer et al. ____ 100—214
2,996,025 8/1961 Georgeff.

FOREIGN PATENTS 609,922 12/1960 Canada.
814,097 9/1951 Great Britain.

WALTER A. SCHEEL, Primary Examiner.

CHARLES A. WILLMUTH, Examiner.